(12) United States Patent
Shirakura et al.

(10) Patent No.: US 6,195,185 B1
(45) Date of Patent: Feb. 27, 2001

(54) IMAGE RECORDING APPARATUS

(75) Inventors: Akira Shirakura, Tokyo; Nobuhiro Kihara, Kanagaawa; Hirotsugu Suzuki, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/387,570

(22) Filed: Sep. 1, 1999

(30) Foreign Application Priority Data

Sep. 3, 1998 (JP) .................................................. 10-249988

(51) Int. Cl.$^7$ ...................................................... G03H 1/04
(52) U.S. Cl. ..................................... 359/35; 359/3; 359/9; 359/12; 359/15; 359/30; 350/3.63; 352/222
(58) Field of Search .............................. 350/3.63; 359/9, 359/35, 12, 15, 3, 30; 352/222

(56) References Cited

U.S. PATENT DOCUMENTS 4,411,503 * 10/1983 Bailey et al. .......................... 352/22
4,946,258 * 8/1990 Fisher et al. .......................... 350/321

* cited by examiner

*Primary Examiner*—Cassandra Spyrou
*Assistant Examiner*—Craig Curtis
(74) *Attorney, Agent, or Firm*—Sonnenschein, Nath & Rosenthal

(57) ABSTRACT

An image recording apparatus is capable of reducing a vibration of a hologram recording medium so that a holographic stereogram which provides an excellent reproduced image can be prepared in a short time period. A vibration member 55 is provided on the light path of reference light L4, and a hologram recording medium 10 is intermittently fed with the medium 10 kept in contact with an end portion 55a of the member 55. The reference light L4 passes through a slit 56 of the vibration restriction member 55 and is irradiated onto the hologram recording medium 10 through an opening portion 57 opened at the end side 55a.

5 Claims, 13 Drawing Sheets

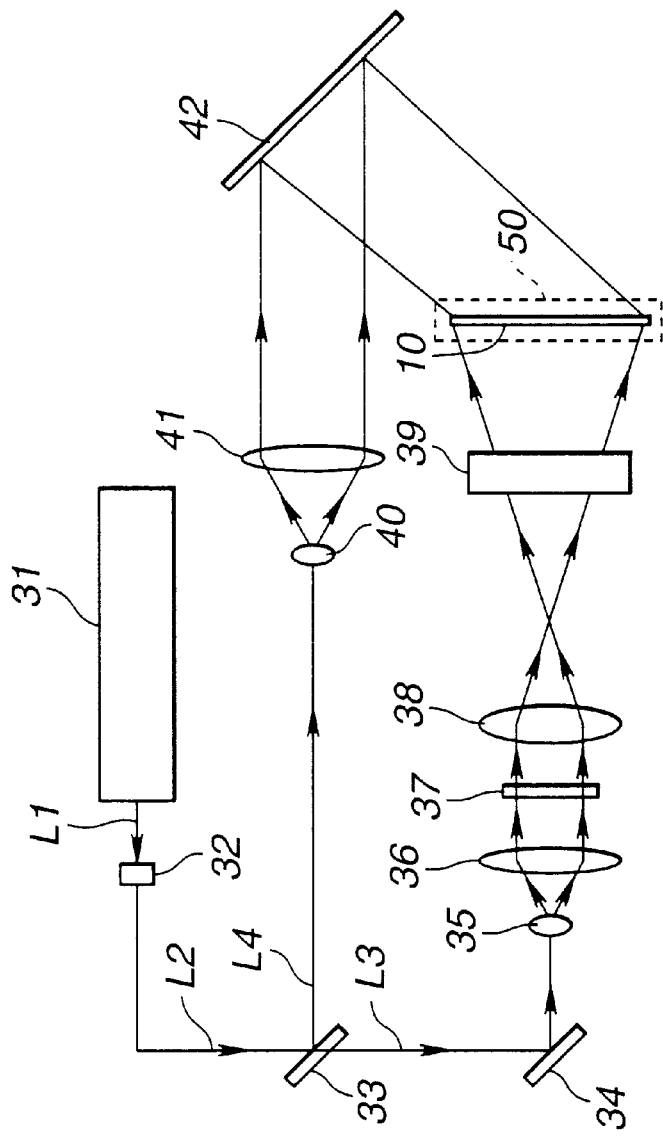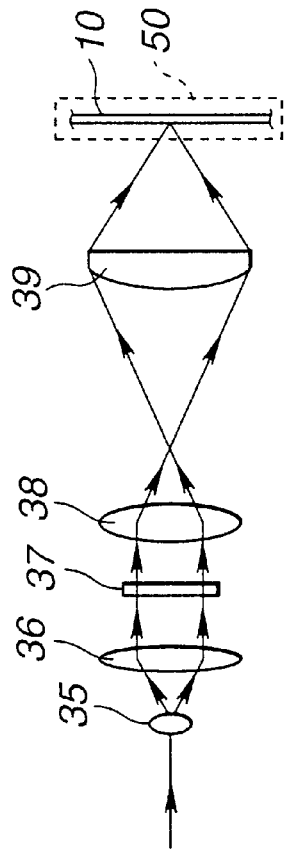
FIG.5A
FIG.5B

IMAGE RECORDING APPARATUS

RELATED APPLICATION DATA

The present application claims priority to Japanese Application No. P10-249988 filed Sep. 3, 1998 which application is incorporated herein by reference to the extent permitted by law.

TECHNICAL FIELD

The present invention relates to an image recording apparatus for preparing a holographic stereogram which is recorded so that an actual image or a computer-generated image can be observed three-dimensionally.

BACKGROUND OF THE INVENTION

A holographic stereogram is prepared as follows. For example, an object is sequentially picked up from different observation view points, to obtain a number of images. These images which are used as original images are recorded sequentially as hologram elements in form of strips or dots onto a piece of hologram recording medium, by means of an image recording apparatus.

For example, as shown in FIG. 1, a holographic stereogram having parallax information in only the lateral direction is prepared in a manner in which a plurality of original images 101a to 101e obtained by sequentially picking up an object 100 from different observation points in the lateral direction are sequentially recorded as strip-like hologram elements 102 onto a hologram recording medium by an image recording apparatus. A plurality of original images which are recorded as hologram elements onto the hologram recording medium are not always limited to those images that are obtained by actually picking up the object 100 but may be CAD (Computer Aided Design) images or CG (Computer Graphics) images.

In case of this holographic stereogram, pieces of image information obtained by sequentially picking up an object from different observation points in the lateral direction are sequentially recorded as strip-like hologram elements in the lateral direction. Therefore, when this holographic stereogram is observed with eyes by an operator, two-dimensional images respectively projected on the left and right eyes are slightly different from each other. As a result, the operator feels parallax and understands these images as a three-dimensional image.

Meanwhile, an image recording apparatus records hologram elements of a holographic stereogram onto a hologram recording medium using a photosensitive material as a recording material, in the following manner. That is, in case of preparing a holographic stereogram of a reflection type, a laser beam having a good interference characteristic is branched into two beams, and one of the two beams is irradiated, as a projection image (object light) subjected to two-dimensional image modulation by an image display means such as a liquid crystal panel or the like, onto one surface of a hologram recording medium. Also, in the image recording apparatus, the other one of the two branched laser beams is irradiated, as reference light, onto the other surface of the hologram recording medium. As a result, an interference fringe is formed, as a change of the refraction factor or a change of the transmittance, in the photosensitive material of the hologram recording medium, and thus, a hologram element is recorded.

For the image recording apparatus for recording hologram elements of a holographic stereogram onto a hologram recording medium, it is necessary to fix perfectly the hologram recording medium during exposure of a recording image so that even a slight vibration which is as small as the order of wavelength of light might not be generated, in order to prepare a holographic stereogram which provides an excellent reproduced image.

The image recording apparatus is arranged so as to record sequentially a large number of hologram elements while transferring the hologram recording medium little by little. Therefore, in case where a hologram recording medium is transferred, for example, with use of an electrically movable stage, a vibration is caused in the hologram recording medium itself as the medium is transferred. Accordingly, in this kind of image recording apparatus, exposure must be carried out after a vibration caused by transfer of a hologram recording medium is attenuated, in order to prepare a holographic stereogram which provides an excellent reproduced image. Therefore, there is a problem that a very long time is required to prepare one holographic stereogram and the productivity is low.

The present invention hence has an object of providing an image recording apparatus by which vibrations of a hologram recording medium are reduced and a holographic stereogram which provides an excellent reproduced image can be prepared in a short time period.

SUMMARY OF THE INVENTION

According to the present invention, there is provided an image recording apparatus for irradiating object light onto one surface of a hologram recording medium and reference light onto another surface of the hologram recording medium thereby to record sequentially images of a parallax image sequence, as hologram elements, onto the hologram recording medium, comprising: transfer means for transferring the hologram recording medium; and a vibration restriction member provided on either a light path of the object light or a light path of the reference light, for restricting a vibration of the hologram recording medium by making an end side of the vibration restriction means contact with the hologram recording member transferred by the transfer means, the end side being provided with an opening portion, wherein the object light or the reference light is irradiated onto the hologram recording medium through the opening portion provided at the end side of the vibration restriction member which is made contact with the hologram recording medium.

According to the image recording apparatus described above, the hologram recording member is transferred by the transfer means. At this time, the hologram recording medium transferred by the transfer means is brought into contact with an end side of the vibration restriction member, so that a vibration caused by the transfer of the medium is restricted.

In addition, the object light or the reference light is irradiated onto the hologram recording medium through an opening portion formed at one end side of the vibration restriction member.

In the image recording apparatus, the opening portion of the vibration restriction member is desirably formed to have a size corresponding to the hologram element. In case where the opening portion of the vibration restriction member is thus formed to have a size corresponding to the hologram element, the width of the object light or the reference light is set to a width corresponding to the hologram element if the width of the object light or the reference light is determined by the opening portion of the vibration restriction member. Accordingly, it is possible to avoid a problem that the object light or the reference light is irradiated onto adjacent regions over the predetermined region where the hologram element should be recorded, thereby involving a decrease of the diffraction efficiency which deteriorates a recorded image.

Also, in the image recording apparatus, processing for improving wear resistance of the vibration restriction member is desirably made on at least the end side of the vibration restriction member which contacts with the hologram recording medium. If processing for improving the wear resistance of the vibration restriction member is thus made on the end side of the vibration restriction member which contacts with the hologram recording medium, damages on the vibration restriction member are reduced.

Also, in the image recording apparatus, light absorbing means for absorbing light is desirably provided at least on a part of the vibration restriction member. If light absorbing means is thus provided on the vibration restriction member, it is possible to avoid a problem that the object light or the reference light is irregularly reflected on the surface of the vibration restriction member and unnecessary interference fringes are thereby recorded on the hologram recording medium.

Also, the image recording apparatus desirably further comprises: position detection means for detecting a position of the vibration restriction member; and moving operation means for moving the vibration restriction member, wherein the vibration restriction means is positioned at a predetermined exposure position by moving the vibration restriction member by the moving operation means, based on position information concerning the vibration restriction member, detected by the position detection means. In this case, positioning of the vibration restriction member to the exposure position is achieved simply and easily with accuracy.

As is apparent from the above explanation, in the image recording apparatus according to the present invention, a vibration restriction member is provided on the light path of the object light or reference light, and a hologram recording medium is transferred, kept in contact with the vibration restriction member, so that a vibration caused by transfer of the hologram recording medium is greatly reduced. Therefore, according to the image recording apparatus, the waiting time until a vibration caused by transfer of a hologram recording medium is reduced is greatly shortened, so that a holographic stereogram which provides an excellent reproduced image with a high diffraction efficiency can be prepared in a short time period.

BRIEF DESCIRPTION OF THE DRAWINGS

FIGS. 3 are views explaining a process of sensitizing a holographic material.

FIG. 5 is a schematic view showing an example of the structure of an optical system of an exposure processing section.

Figure 13:
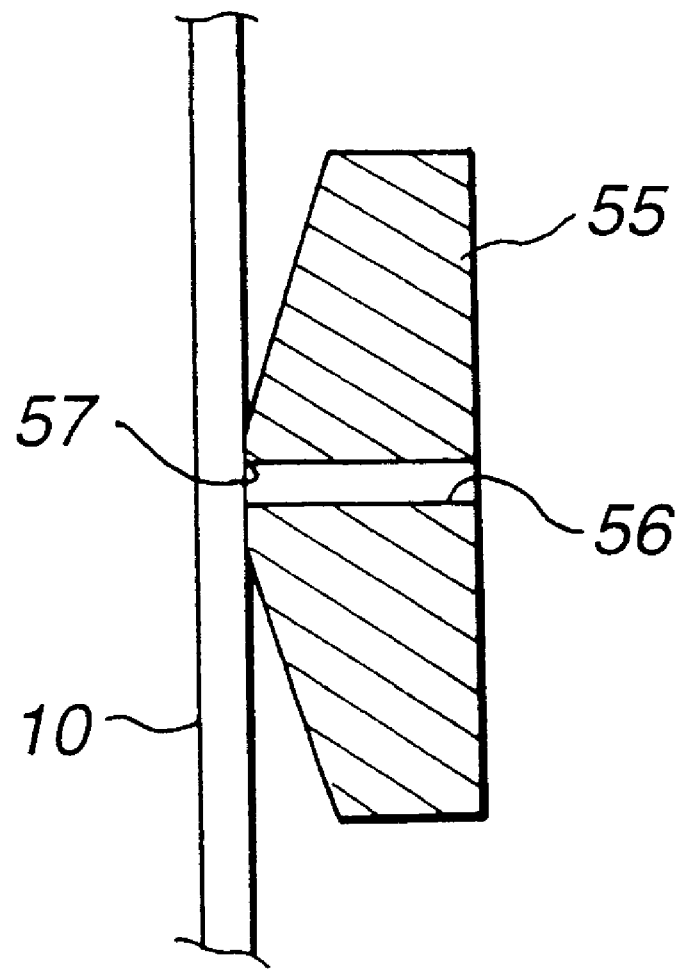

FIG. 13 a longitudinal cross-sectional view showing another example of the vibration restriction member.

Figure 14:
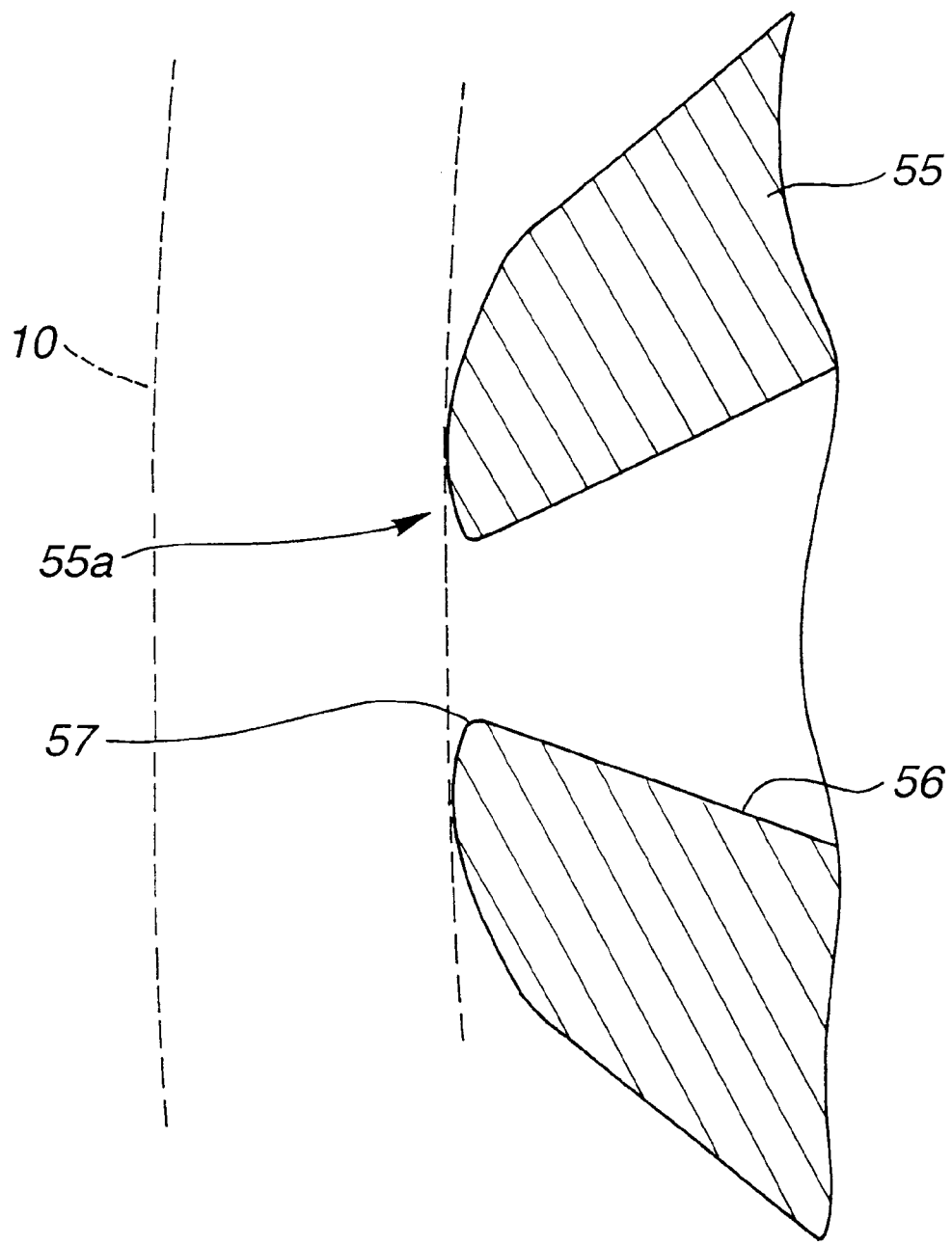

FIG. 14 is an enlarged view showing an end side of the vibration restriction member.

Figure 15:
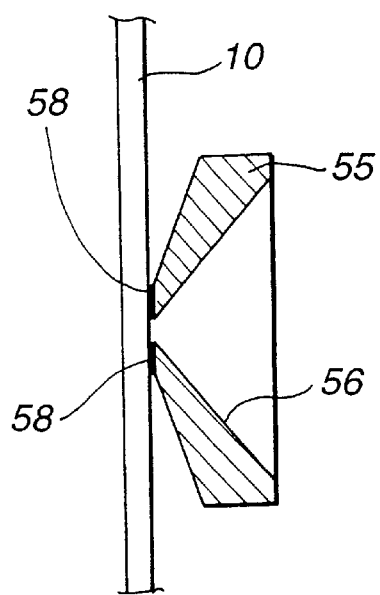

FIG. 15 is a longitudinal cross-sectional view showing the vibration restriction member in which a hard coat film is formed on a portion of the member which contacts with a recording medium.

Figure 16:
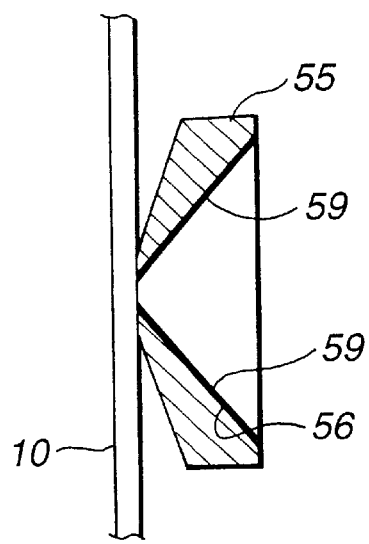

FIG. 16 is a longitudinal cross-sectional view showing the vibration restriction member in which a light absorbing member is provided on a portion of the vibration restriction member which is irradiated with reference light and object light.

Figure 17:
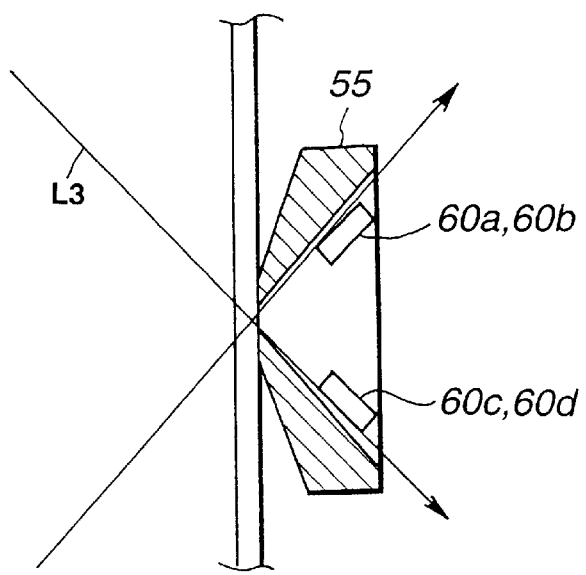

FIG. 17 is a longitudinal cross-sectional view showing the vibration restriction member provided with light detectors.

Figure 18:
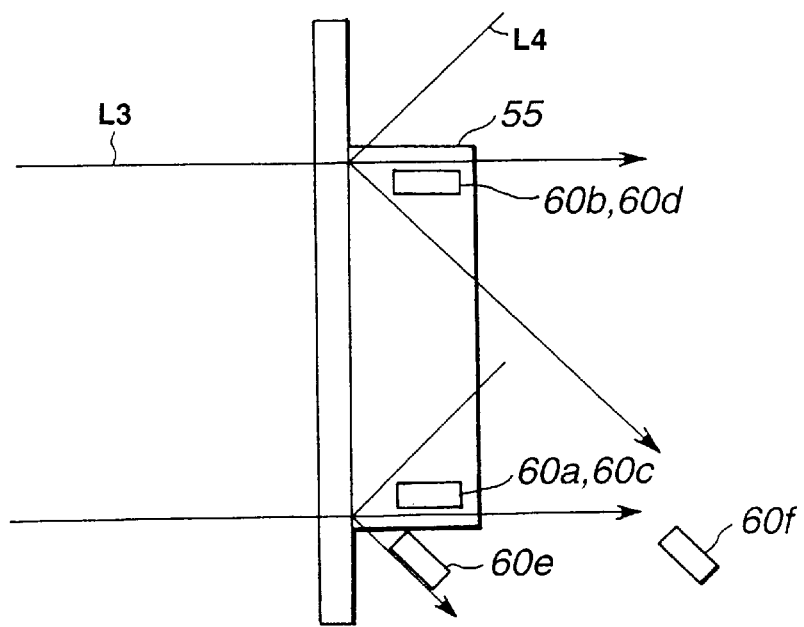

FIG. 18 is a schematic view showing the vibration restriction member provided with light detectors, viewed from upside.

DETAILED DESCRIPTION OF THE INVENTION

In the following, an embodiment of the present invention will be explained with reference to the drawings. Note that the present invention is not limited to the following embodiment but may be variously modified without deviating from the scope of the invention.

At first, explanation will be made of a hologram recording medium used in the image recording apparatus according to the embodiment of the present invention.

Figure 1:
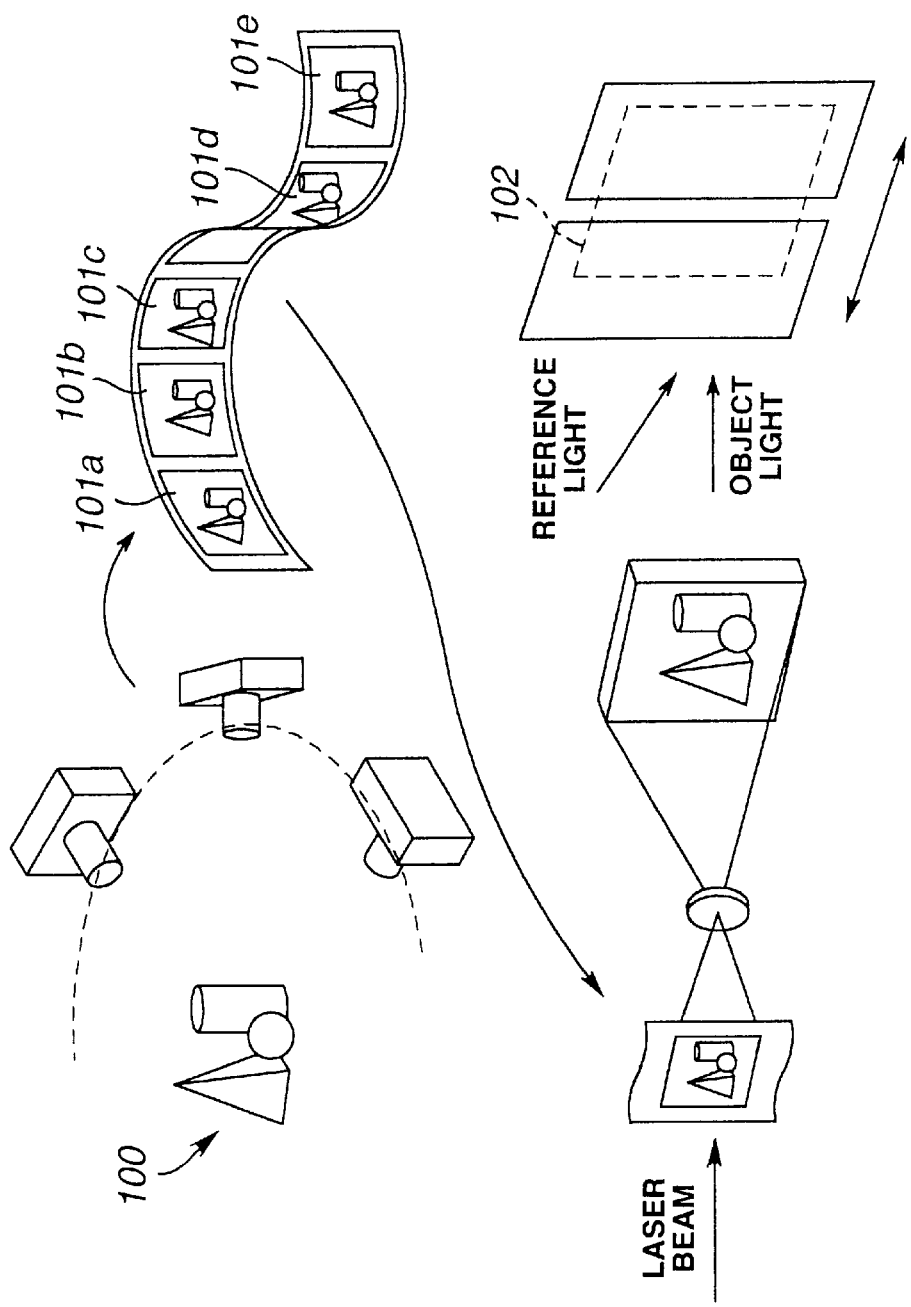
FIG. 1 is a schematic view illustrating a method of preparing a holographic stereogram.
Figure 2:
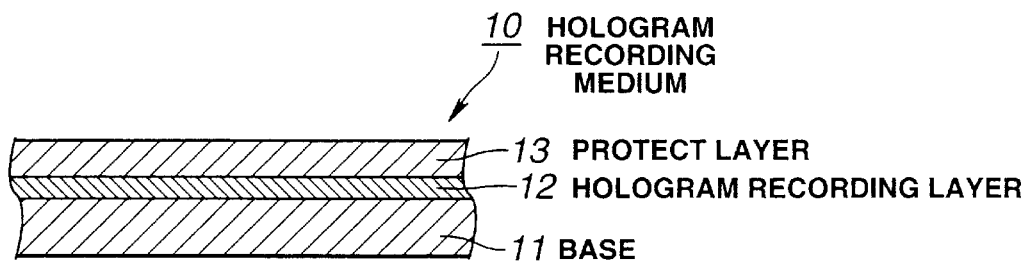
FIG. 2 is a cross-sectional view showing a main part of an example of a hologram recording medium.

As shown in FIG. 2, in the hologram recording medium 10, a hologram recording layer 12 made of a holographic material is formed on a base 11 made of a colorless transparent resin film or the like. Further, a protect layer 13 made of a colorless transparent resin film or the like is formed on the hologram recording layer 12.

When recording a three-dimensional image on the hologram recording medium 10, reference light is transmitted through the base 11 and enters into the hologram recording layer 12. Interference fringes of this light are recorded on the hologram recording layer 12. Therefore, it is necessary for the base 11 and the protect layer 13 to have optical characteristics of less light scattering, less birefringence, and high light transmittance.

Figure 3A:
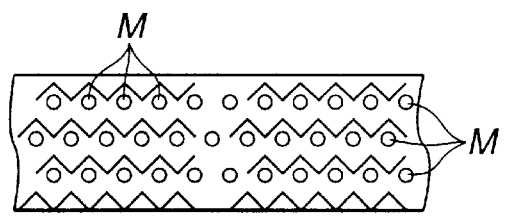
FIG. 3(A) shows a state where monomers are diffused uniformly in a matrix polymer.
Figure 3B:
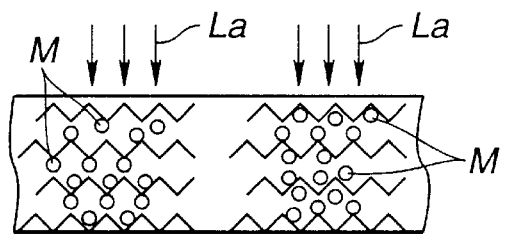
FIG. 3(B) shows a state where light with a predetermined power is irradiated.
Figure 3C:
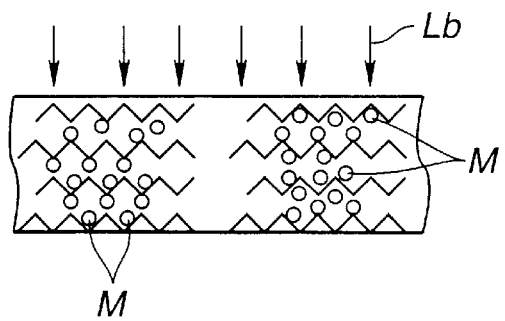
FIG. 3(C) shows a state where ultraviolet light is irradiated on the entire surface.
Figure 4:
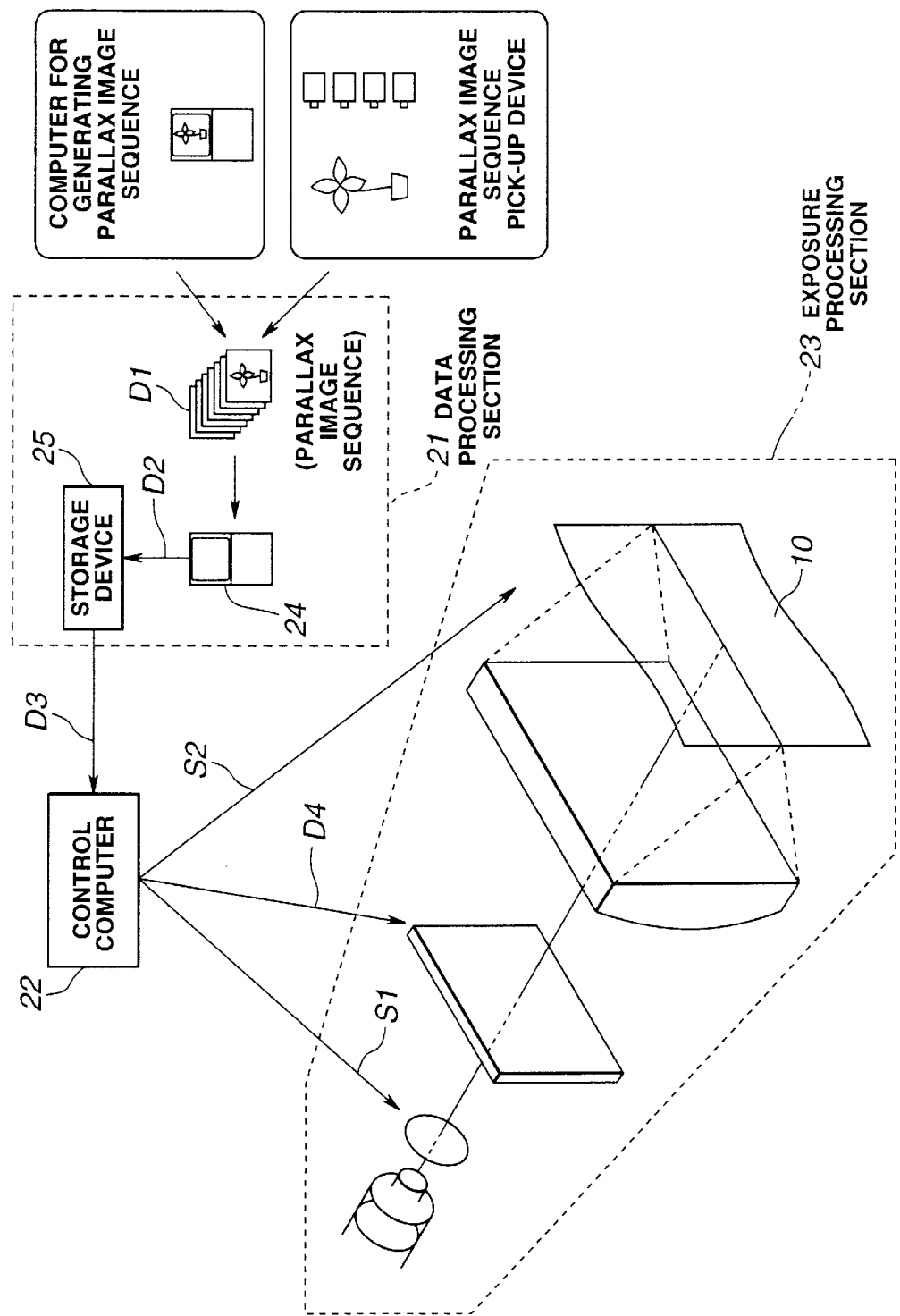
FIG. 4 is a schematic view showing an example of the structure of an image recording apparatus.

Conventional known holographic materials can be widely used for the hologram recording layer 12. In particular, suitable materials are those that record interference fringes generated by interference between reference light and object light, as changes of the refraction factor. Hence, as a holographic material forming the hologram recording layer 12, the present embodiment uses the holographic material "OMNI-DEX" (commercial product name) manufactured by Du Pont. This holographic material consists of photopolymerization polymer. In its initial state, monomers M are diffused uniformly in matrix polymers, as shown in FIG. 3(A). If light La with a power of about 10 to 400 mJ/cm$^2$ is irradiated on this holographic material, as shown in FIG. 3(B), monomers in the portion exposed to light are polymerized in accordance with the power of the irradiated light La. As a result, the density of monomers M changes depending on the spots, thereby causing refraction factor modulation. Thereafter, ultraviolet light Lb with a power of 1000 mJ/cm$^2$ is irradiated on the entire of surface, thereby completing the polymerization of monomers M, so that the degree of refraction factor modulation is increased and this refraction factor modulation is fixed.

Next, explanation will be made of an example of the image recording apparatus according to the present invention by which a three-dimensional image is recorded as a holographic stereogram onto the hologram recording medium 10 described above.

This image recording apparatus comprises a data processing section 21, a control computer 22 for controlling the entire system, and an exposure processing section 23 including an optical system for preparing a holographic stereogram.

The data processing section 21 reads a parallax image sequence D1 from a parallax image sequence pick-up device, a computer for generating a parallax image sequence, or the like. The section 21 then performs predetermined image processing for a holographic stereogram, such as viewpoint conversion processing, Keystone distortion correction processing, or the like, on the parallax image sequence D1 by means of an image processing computer 24, and records image data D2 thus subjected to predetermined image processing, onto a storage device 25 such as a memory, a hard disc, or the like.

The parallax image sequence pick-up device pick up images of an object from a plurality of different viewpoints in the lateral direction, for example, by means of simultaneous image pick-up using a multiple-lens camera or by means of sequential image pick-up using a mobile camera. In addition, the parallax image sequence generation computer uses a technique of CAD, CG, or the like to generate a plurality of images containing parallax information.

A plurality of images picked up by the parallax image sequence pick-up device or by the parallax image sequence generation computer are supplied as a parallax image sequence D1 to the image processing computer 24 of the data processing section 21.

When preparing a holographic stereogram, the data processing section 21 sequentially reads image data from the storage device 25, for every one image, and supplies the image data D3 to the control computer 22.

The control computer 22 controls the exposure processing section 23 to record sequentially images based on the image data D3 and supplied from the data processing section 21, as strip-like hologram elements, onto the hologram recording medium 10 set in the exposure processing section 23.

At this time, the control computer 22 controls a shutter provided in the exposure processing section 23, a display device, a printer head section, and the like. That is, the control computer 22 sends a control signal S1 to the shutter to control opening/closing of the shutter, and supplies image data D4 to the display device to display an image based on the image data D4 on the display device. Also, the control computer 22 sends a control signal S2 to the printer head section to control feeding operation of the hologram recording medium 10 by means of the printer head section.

The exposure processing section 23 will now be explained in more details with reference to FIGS. 5(A) and 5(B). FIG. 5(A) is a view of the entire optical system viewed from the upside. FIG. 5(B) is a view of a part of the optical system of the exposure processing section 23, used for object light. In the image recording apparatus according to the present invention, the optical system of the exposure processing section 23 is not limited to the example described above by may be appropriately modified without deviating from the scope of the present invention. For example, the incidence direction of the reference light, the number of lenses, the types of the lenses, and the combination thereof may be modified.

As shown in FIG. 5(A), the exposure processing section 23 comprises a laser light source 31 for emitting a laser beam having a predetermined wavelength, and a shutter 32 and an half-mirror 33 provided on the light path of the laser beam L1 from the laser light source 31.

The shutter 32 is controlled by the control computer 22 such that the shutter is closed when the hologram recording medium 10 is not exposed with light and is opened when the medium is exposed with light. In this embodiment, on/off of the laser beam is switched with use of the shutter 32. However, if a light source, which emits a stable laser beam immediately after being switched on, is used as the laser light source 31, the laser light source can be switched by turning on/off the laser light source itself, instead of using the shutter 32.

The half-mirror 33 serves to divide a laser beam L2 passed through the shutter 32 into reference light and object light, such that light L3 transmitted through the half-mirror 33 becomes object light while light L4 reflected by the half-mirror 33 becomes reference light.

On the light path of the light L3 transmitted through the half-mirror 33, there are provided, as an optical system for the object light, a total reflection mirror 34 which reflects light transmitted through the half-mirror, a special filter 35 formed by combining a convex lens and a pin hole, a collimator lens 36 for changing the object light into parallel light, a display device 37 for displaying an image as a recording target, a projection lens 38 for projecting object light onto a hologram recording medium 10, and a cylindrical lens 39 for irradiating object light onto the hologram recording medium 10. These components are disposed in this order.

Further, the light L4 transmitted through the half-mirror 33 is reflected by the total reflection mirror 34 and is thereafter changed into diffused light from a point light source by the special filter 35. Next, the light is changed into parallel light by the collimator lens 36 and then enters into the display device 37. Here, the display device 37 is an image display device of transmission type which is made of, for example, a liquid crystal panel, and displays an image based on image data D4 supplied from the control computer 22. Further, the light transmitted through the display device 37 is modulated in accordance with the image displayed on the display device 37, and thereafter enters into the cylindrical lens 39 through the projection lens 38.

Further, the light transmitted through the display device 37 is converged in the lateral direction by the cylindrical lens 39 and this converged light enters, as object light, into the hologram recording medium 10 held in the printer head section 50. That is, in this exposure processing section 23, projection light from the display device 37 enters, as strip-like object light, into the hologram recording medium 10 from the project layer 13 side.

Meanwhile, on the light path of light L4 reflected by the half-mirror 33, there are provided, as an optical system for reference light, a cylindrical lens 40, a collimator lens 41 for changing the reference light into parallel light, and a total reflection mirror 42 for reflecting the parallel light from the collimator lens 41. These components are disposed in this order.

The light reflected by the half-mirror 33 is changed into diverged light by the cylindrical lens 40, at first, and is further changed into parallel light by the collimator lens 41. Thereafter, this light is reflected by the total reflection mirror 42. The light reflected by the total reflection mirror 42 enters into the hologram recording medium 10 from the base 11 side through a vibration restriction member of the printer head section 50 which will be described later.

As has been explained above, according to the exposure processing section 23, the object light transmitted through the half-mirror 33 is transmitted through the protect layer 13 of the hologram recording medium 10 and enters into the hologram recording layer 12. In addition, the reference light reflected by the half-mirror 33 is transmitted through the base 11 of the hologram recording medium 10 and enters into the hologram recording layer 12. That is, the object light enters into one surface of the hologram recording medium 10 such that its light path is substantially vertical to the hologram recording medium 10, while the reference light enters into the other surface ofthe hologram recording medium 10 at a predetermined incidence angle. As a result, the object light and reference light interfere with each other on the hologram recording layer 12 of the hologram recording medium 10. Interference fringes generated by the interference therebetween are recorded as changes of the refraction factor on the hologram recording layer 12 of the hologram recording medium 10.

Although omitted from the figures, the exposure processing section 23 may comprise, for example, a one-dimensional diffusion plate immediately before the hologram recording medium 10 on the light path of the object light. The light converged in the lateral direction by the cylindrical lens 39 of the optical system for object light may be transmitted through the one-dimensional diffusion plate and may be thereby diffused one-dimensionally in the lengthwise direction of the strip-like hologram element, to be irradiated on the hologram recording medium 10. If the exposure processing section 23 is constructed as described above, a prepared holographic stereogram will obtains a sufficient view angle in the longitudinal direction.

Figure 6:
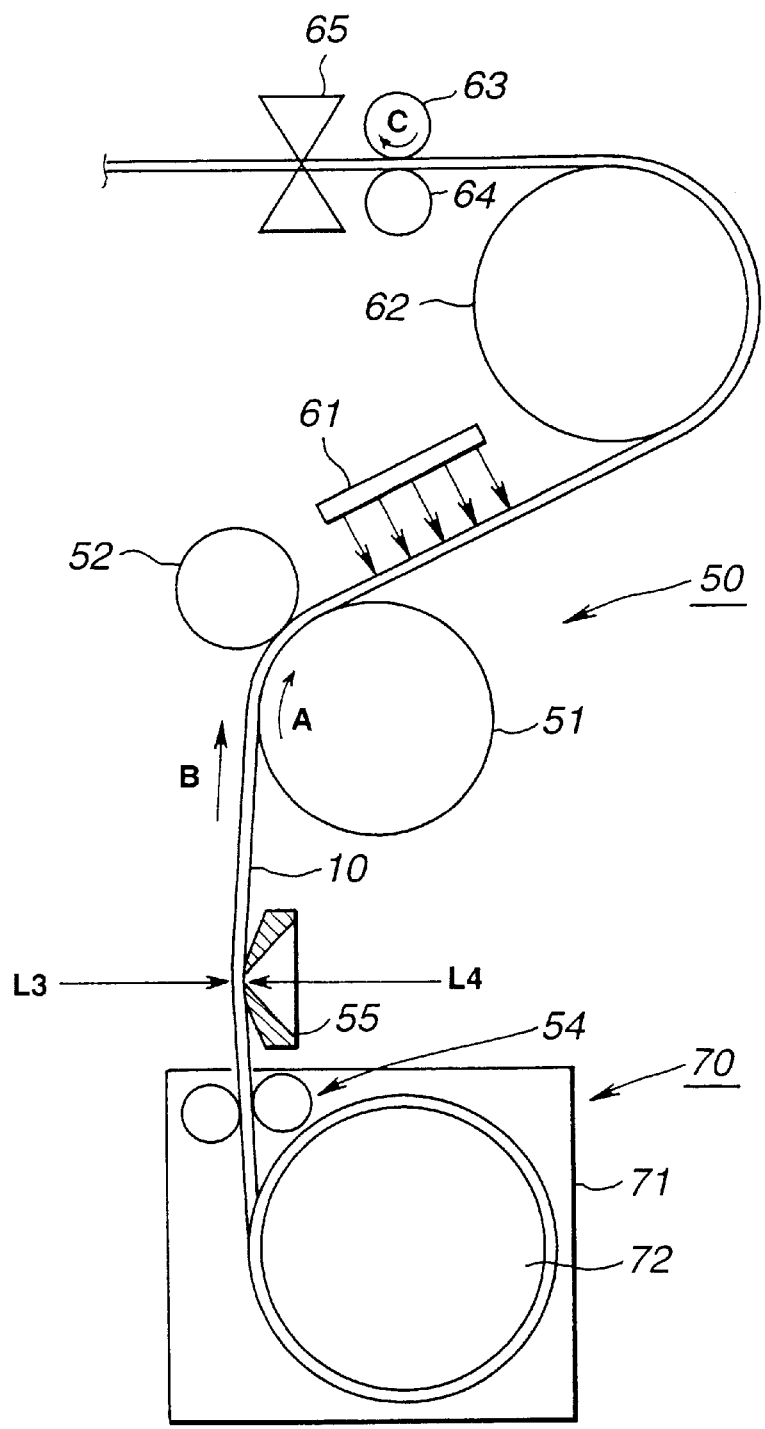
FIG. 6 is a schematic view showing an example of the structure of a printer head section.

Meanwhile, the hologram recording medium 10 on which exposure processing is performed by the exposure processing section 23 is attached to the printer head section which is operated under control of the control computer 22, with the medium 10 contained in a cartridge 71, as shown in FIG. 6, for example.

The printer head section 50 serves to hold and transfer the hologram recording medium 10. The printer head section 50 rotatably supports a roller 72 in the film cartridge 70 attached to a predetermined position, and holds the hologram recording medium 10 pulled from the film cartridge 70 such that the medium 10 is pinched between a pair of intermittent feed rollers 51 and 52. Thus, the printer head section 50 is arranged such that the hologram recording medium 10 can be positioned to be vertical to the optical axis of the object light, at a predetermined exposure position.

Figure 7:
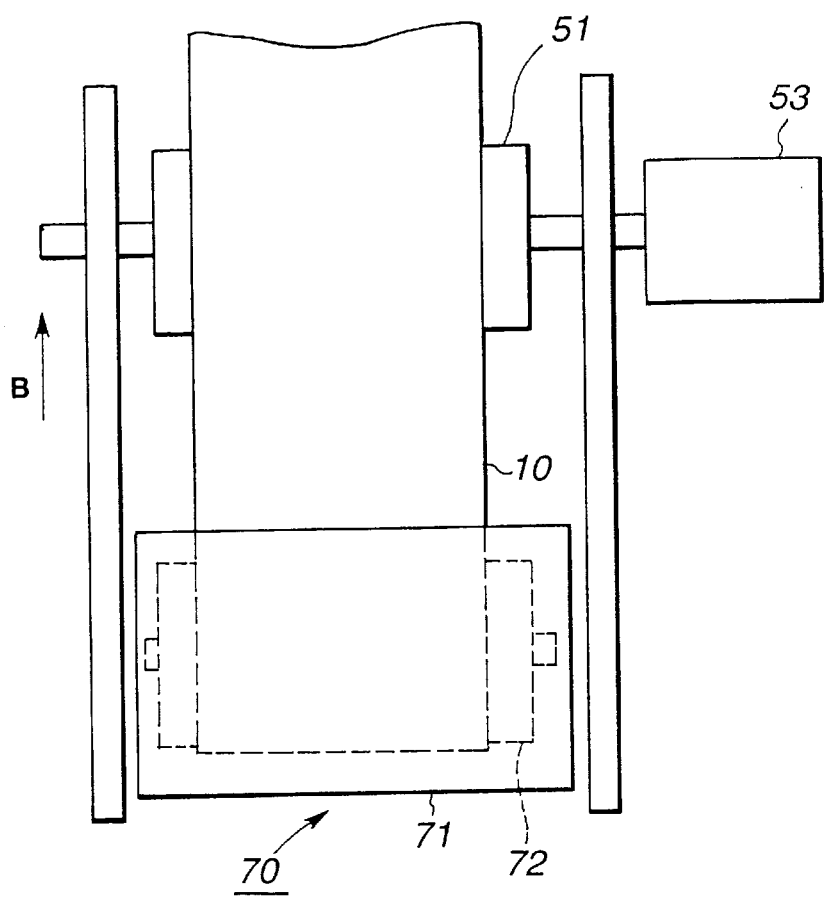
FIG. 7 is an enlarged view showing a part near a intermittent feed roller of the printer head section.

One intermittent feed roller 51 of the pair of intermittent feed rollers 51 and 52 is directly connected to a stepping motor 53, as shown in FIG. 7. This stepping motor 53 is controlled by the control computer 22. Based on a control signal S2 supplied from the control computer 22, the motor 53 intermittently drives the intermittent feed roller 51 to be rotated by a predetermined angle in the direction indicated by the arrow A in FIG. 6, every time when exposure of one hologram element is completed. In this manner, the hologram recording medium 10 held between the pair of intermittent feed rollers 51 and 52 is intermittently fed by an amount equivalent to one hologram element, in the direction indicated by the arrow B in FIGS. 6 and 7, every time when exposure of one hologram element is completed.

Figure 8:
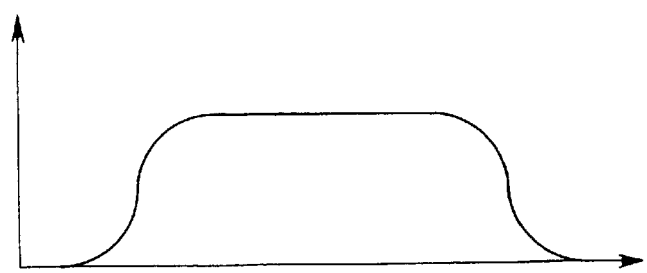
FIG. 8 is a view explaining acceleration/deceleration driving of a stepping motor.

In case where the hologram recording medium 10 is arranged to be intermittently fed by the pair of intermittent feed rollers 51 and 52, the hologram recording medium 10 can be intermittently fed accurately by an amount equivalent to the width of the hologram element, in the following manner. That is, a brake mechanism 54, which clamps the hologram recording medium 10 at a predetermined pressure and restricts feed of the hologram recording medium 10 by a friction force thereof, is provided inside or near the film cartridge 70, and the stepping motor 53 is driven to accelerate and decelerate by S-shaped driving as shown in FIG. 8, thereby to reduce excessive feed of the hologram recording medium 10. If the stepping motor 53 is driven to accelerate and decelerate by S-shaped driving, it is possible to reduce greatly the time until a vibration caused by feeding ofthe hologram recording medium 10 attenuates.

The structure of the brake mechanism 54 is not limited to the example described above but any structure may be adopted as long as the structure is capable of restricting excessive feeding of the hologram recording medium 10 transferred by the pair of intermittent feed rollers 51 and 52.

On the route for transferring the hologram recording medium 10, a vibration restriction member 55 for making a contact with the hologram recording medium 10 thereby to restrict vibration of the hologram is provided in the front stage of the intermittent feed rollers 51 and 52. This vibration restriction member 55 is provided on the light path of the reference light L4. Therefore, the reference light L4 is transmitted through the vibration restriction member 55 and enters into the hologram recording medium 10.

Figure 9:
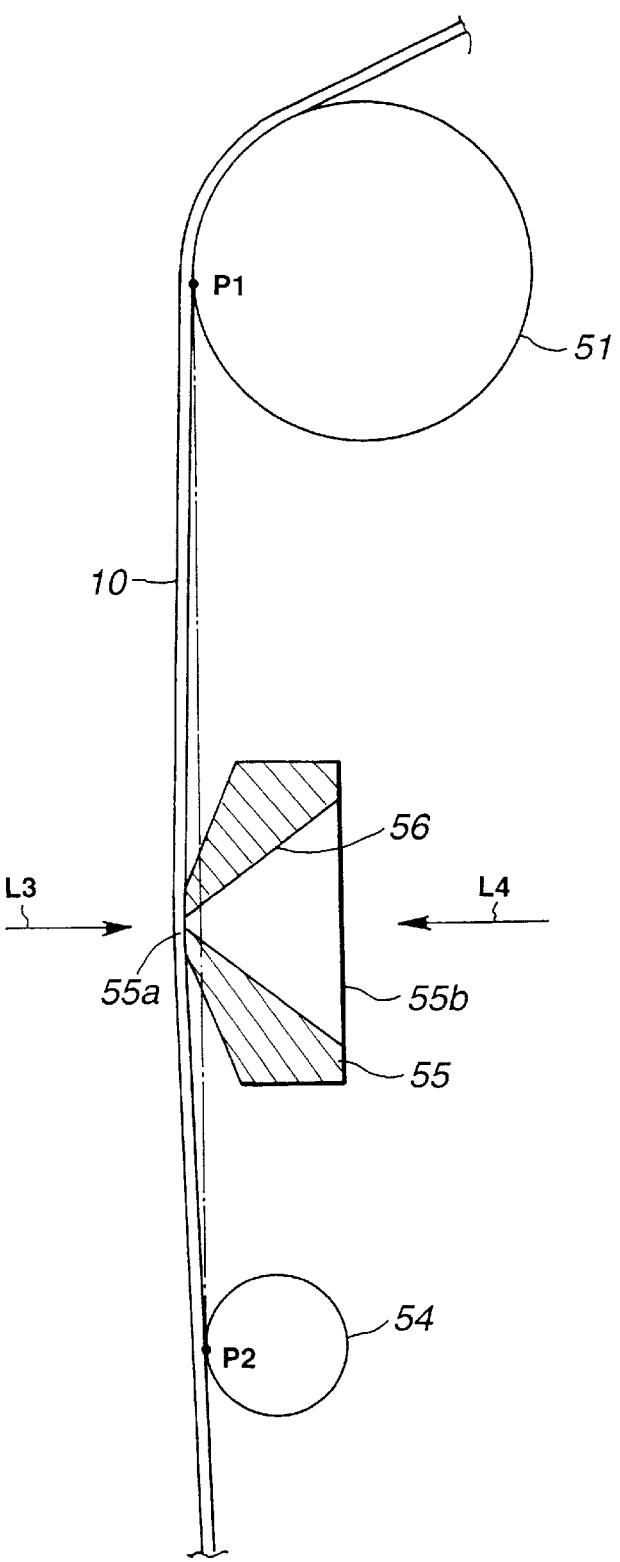
FIG. 9 is a view explaining the position of the vibration restriction member.
Figure 10:
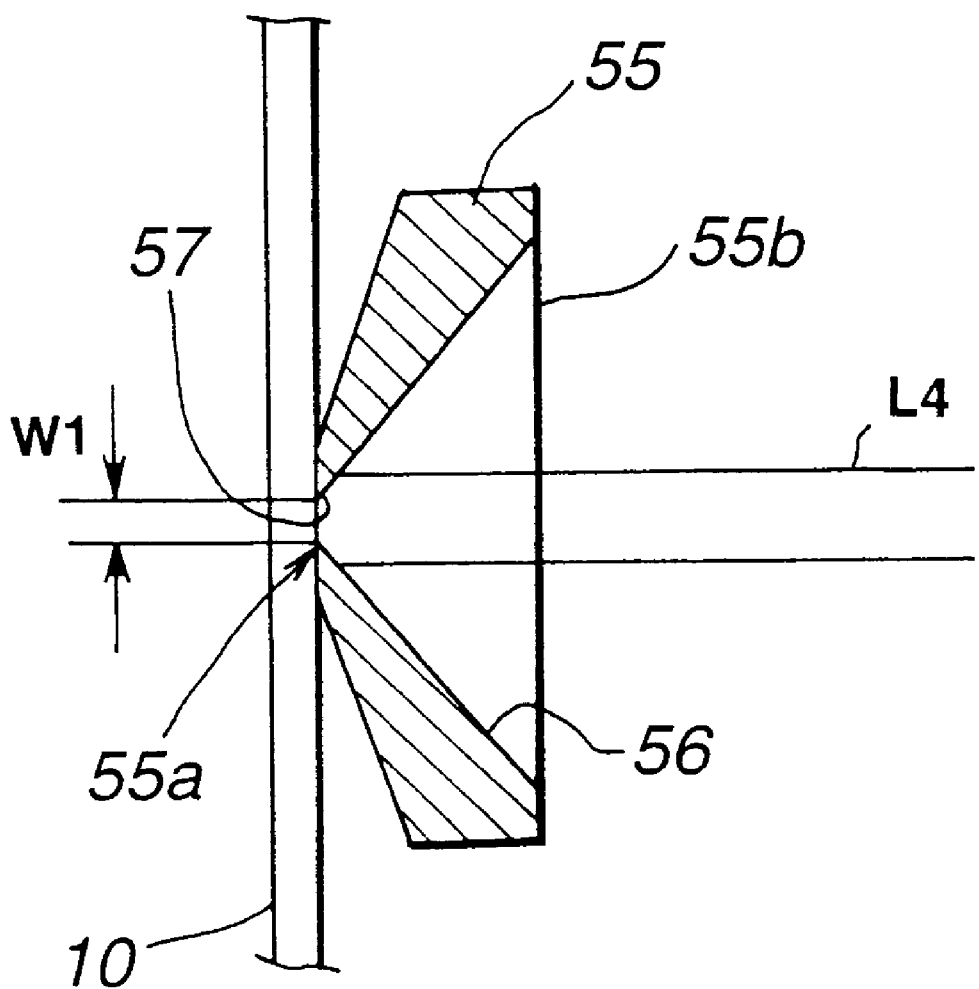
FIG. 10 is a longitudinal cross-sectional view showing a vibration restriction member.

The vibration restriction member 55 is formed of a material having rigidity, such as aluminum alloy or the like, which is shaped to have an end 55a projecting in one side. Further, as shown in FIG. 9, the vibration restriction member 55 is provided on the light path of the reference light L4 such that the side of the end 55a projecting in one side is positioned to be slightly deviated to the side into which the object light L3 enters, from a line connecting a point p1 on the intermittent feed roller 51 on which the hologram recording medium 10 is wound and a point p2 on the brake mechanism 54 at which the hologram recording medium 10 is energized. In this manner, the hologram recording medium 10 has a contact with one end side 55a of the vibration restriction member 55 at a predetermined pressure, when the hologram recording medium 10 is bridged between the intermittent feed rollers 51 and 52 and the brake mechanism 54.

In the printer head section 50 of the image recording apparatus according to the present invention, a vibration restriction member 55 is thus provided on the transfer route of the hologram recording medium 10, and the hologram recording medium 10 is intermittently fed with this medium kept in contact with the vibration restriction member 55. Therefore, it is possible to reduce greatly the vibration caused by transfer of the hologram recording medium 10.

In addition, a slit 56 extending from an end side 55a thereof to another end side 55b is provided in the vibration restriction member 55. For example, this slit 56 is formed in a shape having a diameter which gradually increases in the widthwise direction from the end side 55a to the other end side 55b of the member 55. The vibration restriction member 55 transmits the reference light L4 through the slid 56, to be irradiated onto the hologram recording medium 10. That is, the reference light L4 enters into the vibration restriction member 55 from the other end side 55b of the vibration restriction member 55 and passes through the slit 56. This light L4 is then irradiated onto the hologram recording medium 10 through an opening portion 57 opened at the end side 55a. At this time, those parts of the reference light L4 that are at both ends in its widthwise direction are shielded by the vibration restriction member 55, so that the reference light L4 having a width equal to the opening width W1 of the opening portion 57 is irradiated on the hologram recording medium 10. Therefore, in this printer head section 50, the reference light can be irradiated onto the hologram recording medium 10, with the reference light shaped into a predetermined width, so that the use efficiency of light can be improved and a holographic stereogram with high image quality can be prepared.

Note that the reference light L4 can be irradiated only on an area of the hologram recording medium 10 where a desired hologram element is recorded, if the opening width W1 of the opening portion 57 formed at the end side 55a of the vibration restriction member 55 is set to a width equal to the width of the object light L3 irradiated onto the hologram recording medium 10, i.e., the width of the hologram element.

Figure 11:
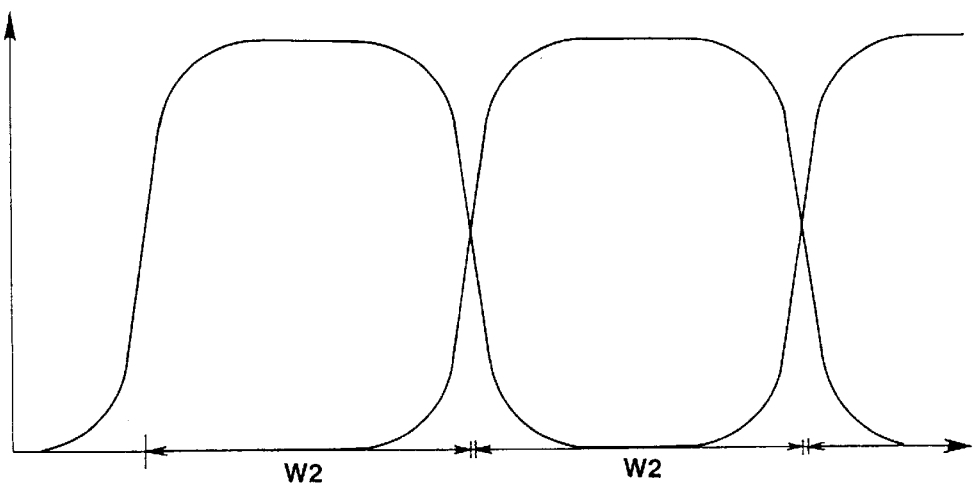
FIG. 11 is a view explaining an exposure state in case where reference light is irradiated on a hologram recording medium without passing through the vibration restriction member.

That is, if the opening width W1 of the opening portion 57 of the vibration restriction member 55 is larger than the width W2 of the hologram element, the reference light L4 is slightly irradiated on the area adjacent to the portion of the hologram recording medium 10 where a desired hologram element is formed, so that deterioration of image quality may be involved at the boundary portion of the element hologram in some cases, as shown in FIG. 11.

Figure 12:
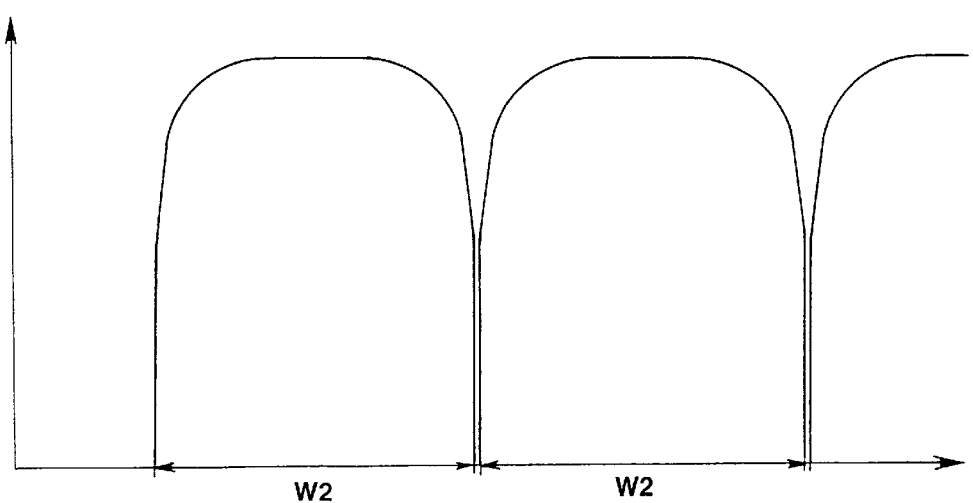
FIG. 12 is a view explaining an exposure state in case where reference light is irradiated on a hologram recording medium through the vibration restriction member.

However, if the opening width W1 of the opening portion 57 of the vibration restriction member 55 is set to a width equal to the width W2 of the hologram element, the reference light L4 is not irradiated onto an adjacent area over the portion where a desired hologram element is formed, so that lowering of the diffraction efficiency or the like is reduced and a holographic stereogram can be prepared with much higher image quality, as shown in FIG. 12.

However, the opening width W1 of the opening portion 57 of the vibration restriction member 55 may be set to be larger than the width ofthe reference light L4. In this case, no parts of the reference light L4 are shielded by the vibration restriction member 55, but the reference light L4 enters into the vibration restriction member 55 from the other end side 55b of the vibration restriction member 55 and passes through the slit 56. Then, this light is irradiated onto the hologram recording medium 10 through the opening portion 57 opened at the end side 55a.

Thus, if no part ofthe reference light L4 is shielded by the vibration restriction member 55, the width of the reference light L4 irradiated onto the hologram recording medium 10 cannot be defined by the opening width W1 of the opening portion 57 of the vibration restriction member 55, but the use efficiency of light can be improved since no part of the reference light L4 is shielded by the vibration restriction member 55.

In the above, explanation has been made to an example in which the vibration restriction member 55 has a slit 56 having a shape whose diameter gradually increases in the widthwise direction. However, the shape of the slit 56 of the vibration restriction member 55 is not particularly limited as long as the shape allows the reference light L4 to be transmitted appropriately and shields parts of the reference light L4 at two ends thereof in its widthwise direction by the vibration restriction member 55. For example, the slit may be formed in a shape which has a uniform width from the end side 55a to the other end side 55b of the vibration restriction member 55.

The vibration restriction member 55 reduces the total friction force caused when transferring the hologram recording medium 10. As a result, it is desirable that the area of the portion which has a contact with the hologram recording medium 10 in the top end side 55a should be as small as possible in order to reduce the transfer drive force for the hologram recording medium 10. However, since this portion receives a load of a predetermined pressure due to contact with the hologram recording medium 10, it is necessary to create at least a contact area large enough to ensure rigidness sufficient for withstanding the load. In addition, if the area of the portion of the vibration restriction member 55 that is brought into contact with the hologram recording medium 10 is too small, this portion may damage the surface of the hologram recording medium 10 when the hologram recording medium 10 is intermittently fed, in some cases. Therefore, the portion of the vibration restriction member 55 which is in contact with the hologram recording medium 10 need be set to such an area which does not damage the hologram recording medium 10, in accordance with the contact pressure against the hologram recording medium 10.

In addition, the portion of the vibration restriction member 55 that contacts with hologram medium 10 is desirably formed in an arc-like shape having a curvature along the traveling direction of the hologram recording medium 10, as shown in FIG. 14. If the portion of the vibration restriction member 55 that contacts with the hologram recording medium 10 is thus shaped like an arc, it is possible to avoid a problem that a load is concentrated particularly on the edge portion of the portion of the vibration restriction member 55 that contacts with the hologram recording member 10. The pressure applied onto the hologram recording medium 10 is dispersed, so that the contact between the vibration restriction member 55 and the hologram recording medium 10 can be improved to be more excellent.

In this printer head section 50, the hologram recording medium 10 is intermittently fed, kept in contact with the end side 55a of the vibration restriction member 55. Therefore, if the end side 55a of the vibration restriction member 55 is worn so that the surface condition is deteriorated, the hologram recording medium 10 is damaged every time when the hologram recording medium 10 is intermittently fed. Accordingly, it is desirable to make processing for improving the wear resistance at the portion of the end side 55a of the vibration restriction member 55 that contacts with the hologram recording medium.

As the processing for improving the wear resistance of the portion of the vibration restriction member 55 that contacts with the hologram recording medium, for example, it is possible to cite an example in which a hard coat film 58 such as a DLC film (Diamond-Like Carbon Film) or the like is formed at the contacting portion of the vibration restriction member 55 against the hologram recording member 10, as shown in FIG. 15.

By thus forming a hard coat film 58 or the like on the portion of the vibration restriction member 55 that contacts with the hologram recording member 10 thereby to improve excellently the wear resistance of the portion which contacts with the hologram recording member 10, the surface condition of this portion is maintained to be excellent so that damages on the hologram recording medium 10 can be restricted. Note that the processing for improving the wear resistance of the portion of the vibration restriction member 55 that contacts with the hologram recording member 10 is not limited to the example in which a hard coat film 58 is formed. For example, hard alumite processing may be made on the vibration restriction member 55. Any processing may be made as long as the processing improves the hardness of the portion that contacts with the hologram recording medium 10.

In addition, processing for absorbing light and restricting reflection is desirably made at least at the portion where the reference light L4 is irradiated and at the portion where the object light L3 transmitted through the hologram recording medium 10 is irradiated, on the surface of the vibration restriction member 55. The processing for absorbing light and restricting reflection may be, for example, processing in which a light absorbing member 59 such as flock paper or the like is adhered on the inner wall portion forming the slit 56 of the vibration restriction member 55, as shown in FIG. 16.

As for the reference light L4 which enters into the vibration restriction member 55, with a width larger than the opening width of the opening portion 57 provided at the end side 55a of the vibration restriction member 55, parts of the reference light L4 at both ends in its widthwise direction are irradiated on the inner wall portion forming the slit 56 of the vibration restriction member 55. In some cases, the object light L3 transmitted through the hologram recording medium 10 is also irradiated on the inner wall portion of the slit 56. Therefore, by providing a light absorbing member 59 on the inner wall portion forming the slit 56 of the vibration restriction member 55, it is possible to avoid a problem that a part of the reference light L4 and the object light which are irradiated onto the inner wall portion repeatedly reflected on the inner wall portion and enter into the hologram recording medium 10 thereby to form unnecessary interference fringes.

Note that the processing for restricting reflection on the surface of the vibration restriction member 55 is not limited to the example in which the light absorbing member 59 is provided but any processing may be adopted as long as the processing for absorbing light irradiated on the surface of the vibration restriction member 55 to restrict reflection. For example, black coating or the like may be provided on the surface of the vibration restriction member 55.

In addition, if black hard alumite processing such as tough coat (hard alumite) processing, metal coat (high-sliding alumite) processing, AB-II (heat resisting electrolytic black) processing, or the like is effected on the entire surface of the vibration restriction member 55, the portion of the vibration restriction member 55 which contacts with the hologram recording medium 10 is improved to be excellent, and simultaneously, reflection of light on the surface of the vibration restriction member 55 is restricted very efficiently.

The vibration restriction member 55 is held by a holder not shown, which is operated to move in the directions parallel and vertical to the travelling direction of the hologram recording medium 10 by a moving operation mechanism not shown. Further, the vibration restriction member 55 is positioned at a predetermined position as the holder is operated to be moved by the moving operation mechanism. Since the vibration restriction member 55 is positioned at a predetermined position, the reference light L4 transmitted through the opening portion 57 of the vibration restriction member 55 enters at a predetermined exposure position of the hologram recording medium 10.

Operation for moving the holder by means of the moving operation mechanism may be carried out manually. However, as shown in FIGS. 17 and 18, photo detectors 60a, 60b, 60c, and 60d may be provided at positions of the vibration restriction member 55 on which the object light L3 transmitted through the hologram recording medium 10 is irradiated, and the moving operation mechanism may be driven to move the holder, based on position information concerning the vibration restriction member 55 which is detected by the photo detectors 60a, 60b, 60c, and 60d. If the vibration restriction member 55 is positioned at a predetermined exposure position in this manner, positioning operation for the vibration restriction member 55 can be carried out simply and easily with accuracy.

Particularly, in case where the opening width WI of the vibration restriction member 55 is set to a width equal to the width with which the object light L3 is irradiated on the hologram recording medium 10, the vibration restriction member 55 must be positioned accurately so that the position at which the reference light L4 is irradiated is matched with the position at which the object light L3 is irradiated. However, if positioning of the vibration restriction member 55 is carried out in a manner that the moving operation mechanism is driven to move the holder on the basis of the position information concerning the vibration restriction member 55 which is detected by the photo detectors 60a, 60b, 60c, and 60d, as described above, the position at which the reference light L4 is irradiated can be accurately matched with the position at which the object light L3 is irradiated. Note that FIG. 17 is a view of the vibration restriction member 55 provided with the photo detectors 60a, 60b, 60c, and 60d, viewed from the lateral direction, i.e., in the direction vertical to the travelling direction of the hologram recording medium 10. FIG. 18 is a view of the vibration restriction member 55 provided with the photo detectors 60a, 60b, 60c, and 60d, viewed from the direction parallel to the travelling direction of the hologram recording medium 10.

In addition, the reference light L4 enters obliquely into the hologram recording medium 10 at a predetermined incidence angle, as described previously. Fine adjustment of the incidence angle of the reference light L4 is preferably achieved by providing photo detectors 60e and 60f on the light path of the reflection light of the reference light L4 which enters at an optimum incidence angle and by adjusting the angle of the above-mentioned total reflection mirror 42 in the optical system for reference light, based on the light amounts detect by the photo detectors 60e and 60f.

By thus making fme adjustment of the incidence angle of the reference light L4, the reference light L4 can be let enter accurately into the hologram recording medium 10 at an optimum incidence angle.

Note that the above explanation has been made of an example in which the vibration restriction member 55 is provided on the light path of the reference light L4 and the reference light L4 is let pass through the slit 56 of the vibration restriction member 55 and enter into the hologram recording medium 10. However, the image recording apparatus according to the present invention is not limited to this example, but the vibration restriction member 55 may be provided on the light path of the object light L3 so that the object light L3 passes through the slit 56 ofthe vibration restriction member 55 and enters into the hologram recording medium 10.

In this case, the vibration restriction member 55 is provided on the light path of the object light L3 such that the end side 55a of the vibration restriction member 55 is slightly deviated in the side in which the reference light L4 enters, from the line connecting the point p1 on the intermittent feed roller 51 on which the hologram recording medium 10 is wound and the point p2 on the brake mechanism 54 at which the hologram recording medium 10 is energized. In this manner, the hologram recording medium 10 has a contact with one end side 55a of the vibration restriction member 55 at a predetermined pressure, when the hologram recording medium 10 is bridged between the intermittent feed rollers 51 and 52 and the brake mechanism 54. Therefore, vibrations caused by transferring the hologram recording medium 10 can be greatly reduced.

On the transfer route of the hologram recording medium 10, an ultraviolet lamp 61 is provided along the transfer route of the hologram recording medium 10 in the rear stage of the intermittent feed rollers 51 and 52, as shown in FIG. 6. This ultraviolet lamp 61 serves to irradiate ultraviolet light with a predetermined power onto the hologram recording medium 10 subjected to exposure. In the hologram recording medium 10 fed by the intermittent feed rollers 51 and 52, diffusion of monomers M is completed by the irradiation of ultraviolet light from the ultraviolet lamp 61.

Also, in the rear stage of the ultraviolet lamp 61 on the transfer route of the hologram recording medium 10, there are provided a heat roller 62 for heating the hologram recording medium 10 irradiated with ultraviolet light for a predetermined time period, a pair of discharge feed rollers 63 and 64 for transferring the hologram recording medium 10 heated by the heat roller 62 toward the discharge side, and a cutter 65 for cutting the hologram recording medium transferred by the discharge feed rollers 63 and 64, for every sheet of holographic stereogram.

The heat roller 62 internally comprises a heating means not shown, and the circumferential surface of the roller 62 is arranged so as to maintain a temperature of, for example, about 120 by the heating means. Heating processing is performed on the hologram recording medium 10 by transferring the hologram recording medium 10 kept pressed in contact with the circumferential surface maintained at the predetermined temperature, after ultraviolet light is irradiated by the ultraviolet lamp 61.

The outer dimensions of this heat roller 62 are designed such that a time enough to fix a recording image elapses during a time period from when the hologram recording medium 10 begins to contact with the circumferential surface to when the medium 10 comes apart therefrom.

A pair of discharge feed rollers 63 and 64 are constructed such that the hologram recording medium 10 subjected to heating processing by the heat roller 62 is pinched between the discharge feed rollers 63 and 64. The roller 63 of the pair of discharge feed rollers 63 and 64 is connected directly to a motor not shown, and rotates in the direction indicated by the arrow C in FIG. 6 in synchronization with the intermittent feed rollers 51 and 52. As a result of this, the pair of discharge feed rollers 63 and 64 are capable of transferring the hologram recording medium 10 with the medium securely pressed in contact with the circumferential surface of the heat roller 62, without loosening the medium 10.

The cutter 65 is connected to a cutter drive mechanism not shown, and cuts the hologram recording medium 10 transferred by the discharge feed rollers 63 and 64 under control by the cutter drive mechanism.

Based on a control signal S2 supplied from the control computer 12 described above, the cutter drive mechanism drives the cutter 65, in the stage in which the portion of the hologram recording medium 10 which corresponds to one sheet of holographic stereogram is all transferred to the rear stage of the cutter 65. As a result of this, the hologram recording medium 10 subjected to exposure is cut for every one sheet of holographic stereogram.

In the image recording apparatus according to the invention constructed as described above, since the hologram recording medium 10 is transferred, kept in contact with the vibration restriction member 55, a vibration caused by the transfer of the hologram recording medium is greatly reduced. Therefore, according to the present image recording apparatus, it is possible to reduce greatly the waiting time required until the vibration caused by transfer of the hologram recording medium 10 is reduced. As a result of this, a holographic stereogram which provides an excellent reproduced image with a high diffraction efficiency can be prepared in a short time period.

In addition, according to the present image recording apparatus, parts of the reference light L4 in its widthwise direction are shut off by transmitting the reference light L4 through the slit 56 provided in the vibration restriction member 55, so that the reference light L4 shaped into a predetermined width is irradiated on the hologram recording medium 10. Therefore, the use efficiency of the reference light L4 is improved, and a holographic stereogram with high image quality can be prepared.

The above explanation has been made of an image recording apparatus for preparing a holographic stereogram with parallax information in the horizontal direction, by recording a plurality of strip-like hologram elements onto one hologram recording medium 10. The image recording apparatus according to the present invention is not limited to this example, but a holographic stereogram with parallax information in the lateral and longitudinal directions may be prepared, for example, by recording dot-like hologram elements onto one hologram recording medium 10.

In this case, the same effects and advantages as described above can be obtained in a manner in which the shape of the opening portion 57 of the vibration restriction member 55 is arranged into, for example, a circle or an ellipse in correspondence with the dot-like hologram element.

Although the above explanation has been made of an image recording apparatus for preparing a monotone holographic stereogram, the image recording apparatus according to the present invention is not limited to this example but may be constructed so as to prepare a color holographic stereogram. In this case, for example, three light beams of three primary colors may be used as light beams for recording.

In addition, the direction at which the reference light L4 enters into the hologram recording medium 10, the number of lenses forming part of the optical system, the types thereof, the combination thereof, and the like are not limited to those disclosed in the above example but may be appropriately modified if necessary.

What is claimed is:

1. An image recording apparatus for irradiating object light onto one surface of a hologram recording medium and reference light onto another surface of the hologram recording medium thereby to record sequentially images of a parallax image sequence, as hologram elements, onto the hologram recording medium, comprising:

transfer means for transferring the hologram recording medium; and a vibration restriction member provided on either a light path of the object light or a light path of the reference light, for restricting a vibration of the hologram recording medium by keeping an end side of the vibration restriction member in constant contact with the hologram recording medium transferred by the transfer means, the end side being provided with an opening portion, wherein the object light or the reference light is irradiated onto the hologram recording medium through the opening portion provided at the end side of the vibration restriction member which is in contact with the hologram recording medium.

2. An image recording apparatus according to claim 1, wherein the opening portion of the vibration restriction member is formed in a size corresponding to the hologram element.

3. An image recording apparatus according to claim 1, wherein processing for improving wear resistance of the vibration restriction member is made on at least the end side of the vibration restriction member which contacts with the hologram recording medium.

4. An image recording apparatus according to claim 1, wherein light absorbing means for absorbing light is provided at least on a part of the vibration restriction member.

5. An image recording apparatus according to claim 1, further comprising:

position detection means for detecting a position of the vibration restriction member; and moving operation means for moving the vibration restriction member, wherein the vibration restriction member is positioned at a predetermined exposure position by moving the vibration restriction member by the moving operation means, based on position information concerning the vibration restriction member, detected by the position detection means.

\* \* \* \* \*